United States Patent [19]
Kappel et al.

[11] Patent Number: 5,657,803
[45] Date of Patent: Aug. 19, 1997

[54] STUMP CUTTER

[76] Inventors: Gary W. Kappel, 1530 Elmwood Dr.; Philip J. Egging, 1203 ½ Columbus St., both of Pella, Iowa 50219; Harlan E. Thompson, 1349 S. Attica Rd., Knoxville, Iowa 50138

[21] Appl. No.: 479,170

[22] Filed: Jun. 7, 1995

[51] Int. Cl.⁶ .................................................. A01G 23/06
[52] U.S. Cl. ..................... 144/24.12; 37/302; 144/334; 241/101.76
[58] Field of Search .......................... 241/101.71, 101.72, 241/101.74, 101.76; 37/302; 144/24.12, 334

[56] References Cited

U.S. PATENT DOCUMENTS

| | | | |
|---|---|---|---|
| 2,887,134 | 5/1959 | Bartlett | 144/24.12 |
| 2,912,022 | 11/1959 | Ver Ploeg et al. | |
| 2,927,613 | 3/1960 | Franzen et al. | 144/24.12 |
| 3,308,860 | 3/1967 | De Shano | |
| 3,568,740 | 3/1971 | Speakman | |
| 3,747,966 | 7/1973 | Wilkes et al. | |
| 4,074,447 | 2/1978 | Shivers, Jr. et al. | |
| 4,271,879 | 6/1981 | Shivers, Jr. et al. | |
| 4,530,385 | 7/1985 | York | 144/24.12 |
| 4,690,183 | 9/1987 | Eilertson | |
| 4,709,736 | 12/1987 | Bellars | |
| 4,848,423 | 7/1989 | Yoder | |
| 5,203,388 | 4/1993 | Bowling | |
| 5,435,359 | 7/1995 | Craft | 144/334 |
| 5,588,474 | 12/1996 | Egging | 144/24.12 |

OTHER PUBLICATIONS

Copy of a 4-page document regarding a Walterscheid shaft.
Copy of 4-page brochure for Ashland Industries, Inc.—re Stump Master.
Copy of 2-page brochure for Jeffco Stump Saw, Inc.
Copy of 5-page brochure for Jeffco Stump Saw, Inc. showing stump removal equipment.
Copy —2 page document —Rayco RG 1635-A/SA Spec Data Rayco Manufacturing, Inc. 1991.
Copy —2 page document —Rayco RG 1665 (AC) Spec Data Rayco Manufacturing, Inc. 1991.
Copy —2 page document —Rayco RG 1635-A Spec Data Rayco Manufacturing, Inc. 1991.
Copy —2 page document —Rayco RG 1670-DC Spec Data Rayco Manufacturing, Inc. 1991.

*Primary Examiner*—W. Donald Bray
*Attorney, Agent, or Firm*—Henderson & Sturm

[57] ABSTRACT

A stump cutter having a frame including a movable boom and an engine mounted on the frame. The drive engine includes a rotating output shaft and cutter drivably attached to a rotatable cutter shaft disposed on the boom. A drive transmitting shaft is provided for connecting the output shaft and the cutter wheel shaft. A coupler is provided for connecting the first end of the shaft to the engine output shaft and a second coupler is provided for connecting the second end of the shaft to the cutter shaft.

64 Claims, 5 Drawing Sheets

STUMP CUTTER

TECHNICAL FIELD

This invention pertains generally to stump cutters, and more particularly to a stump cutter utilizing a shaft to interconnect the output of an engine and a cutter wheel shaft.

BACKGROUND ART

In recent years, the practice of removing undesirable tree stumps has been revolutionized by the introduction of stump cutting machines. Stump cutters typically utilize a gasoline or diesel engine to rotate a cutter wheel that grinds tree stumps into chips. Generally, power is transmitted from the engine to the cutter wheel via a drive train consisting, at least in part, of pulleys and belts and/or sprockets and chains.

Larger stump cutters typically have a two-stage cutter wheel drive train. Both stages may consist of a system of pulleys and belts, or the like. Alternatively, the first stage may consist of a hydraulic pump and motor system. Smaller stump cutters tend toward a single stage drive train which may be either a belt and pulley type system, or a hydraulically driven system.

The cutter wheel is typically attached to an axial shaft supported by two sealed bearings disposed on opposite sides of the cutter wheel. The final driven sprocket, or a hydraulic motor, is usually mounted at one end of the shaft.

The current drive configurations suffer from a number of drawbacks and limitations. Belts, pulleys, and the like, require that proper tension and alignment be maintained. In a drive train where both stages consist of belt and pulley systems, altering the tension or alignment at either of the stages affects the other stage, the components of which must then be readjusted. Substantial shielding of belt drives is also required, which can limit visibility during the cutting process. Avoiding interference of the shielding with machine components or other obstacles may also limit the cutting range of the stump cutter.

Hydraulic motors mounted on the cutter wheel shaft are vulnerable to damage unless shielded. This may add significant bulk in the area of the cutter wheel shaft, which can limit the cutting range of the stump cutter. In general, hydraulic drives are more expensive than mechanical drives and they typically deliver a lower percentage of engine horsepower to the cutter wheel.

With most current designs, the cutter wheel support bearings each have two seals, one on each side of the rolling elements. Occasionally, replacement of the cutter wheel bearings is required because debris damages the grease seals or works past the seals into the rolling elements of the bearing. Also, these bearings typically require manual relubrication periodically; failure may result from heat build-up due to insufficient or excessive lubrication. Bearing, cutter wheel, or cutter wheel shaft removal/replacement usually requires removal of the assembly comprised of the cutter wheel and shaft, two bearings, and the driven sprocket/ pulley, or the hydraulic motor. Bearing removal from the shaft is often a difficult process resulting in damage to, or destruction of, the bearings and/or shaft. Reassembly requires realignment and retensioning of final drive pulleys, belts, etc.

A stump cutter unit powered by a farm tractor power take-off shaft is also known in the art. One major disadvantage of this unit is that the tractor itself must be repositioned to move the cutter wheel from side to side over the stump surface.

Those concerned with these and other problems recognize the need for an improved stump cutter.

DISCLOSURE OF THE INVENTION

The present invention relates generally to a stump cutter having a frame including a movable boom and an engine mounted on the frame. The drive engine includes a rotating output shaft, and the cutter is drivably attached to a rotatable cutter shaft disposed on the end of the boom. A drive transmitting shaft is provided for connecting the output shaft of the engine and the cutter wheel shaft. A coupler is provided for connecting the first end of the shaft to the engine output shaft and a second coupler is provided for connecting the second end of the shaft to the cutter shaft.

An object of the present invention is to provide an improved stump cutter.

Another object of the present invention is to provide a simplified drive train for a stump cutter.

A further object of the present invention is to provide a stump cutter which permits the engine to be mounted on resilient engine mounts to reduce vibration, a feature not practical on pulley-belt or sprocket-chain drive systems.

A still further object of the present invention is to provide a drive system with a resilient component which minimizes potential damage to the drive train by dampening shock caused by engine combustion or shock forces created by the cutting operation.

Other objects, advantages, and novel features of the present invention will become apparent from the following detailed description of the invention when considered in conjunction with the accompanying drawings.

BEST MODES FOR CARRYING OUT THE INVENTION

Figure 1:
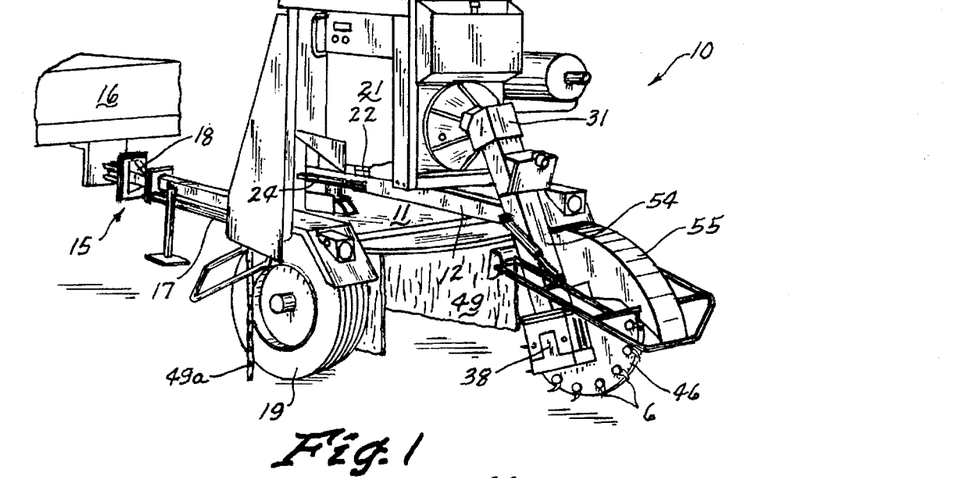
FIG. 1 a perspective view of a preferred embodiment of a stump cutter of the present invention attached to a towing vehicle.
Figures 4, 5:
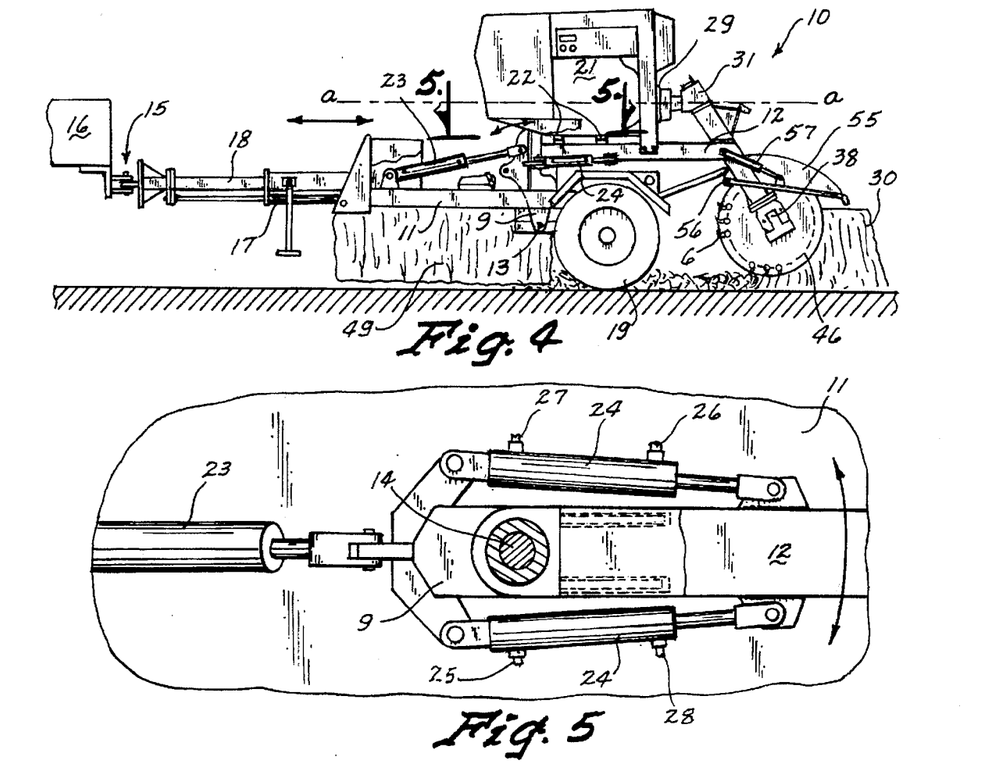
FIG. 4 is a side elevational view similar to FIG. 2 showing the stump cutter in the lowered position engaging and cutting a stump, and showing the tongue extended from the position shown in FIG. 2.
FIG. 5 is an enlarged partial cross sectional view taken along line 5—5 of FIG. 4 showing the boom lifting cylinder, and the cylinders used to oscillate the cutter wheel back and forth across the surface of the stump.

Referring now to the drawings wherein like reference numerals designate identical or corresponding parts throughout the several views, FIG. 1 shows a stump cutter (10) constructed in accordance with the present invention. As best shown in FIGS. 1–5, the stamp cutter (10) includes a frame (11) having a longitudinal axis a—a and a movable boom (12) pivotally attached to the frame (11) about a horizontal axis of pin (13). Referring to FIGS. 4 and 5, a connector member (9), including the pin (13), also permits the boom (12) to pivot about the vertical axis of shaft (14) as shown in FIG. 5. A hitch assembly (15) permits the stump cutter (10) to be hitched to a towing vehicle (16) and a tongue extending cylinder (17) permits the tongue (18) to telescope between the retracted position shown in FIG. 2 and the extended position shown in FIG. 4. Pneumatic wheels and tires (19) are rotatably attached to the frame (11) for permitting the stump cutter (10) to be towed from place to place, and also to facilitate the movement of the tongue (18) by the tongue extension cylinder (17) between the positions shown in FIGS. 2 and 4.

An engine (21) is mounted by resilient engine mounts (22) to the boom (12) as shown in FIGS. 1–4. The engine (21) powers a hydraulic pump (not shown) for providing hydraulic fluid to the tongue extension cylinder (17), the boom lifting cylinder (23), and the boom swinging cylinders (29). The boom lifting cylinder (23) raises and lowers the boom (12) between the positions shown in FIGS. 2 and 4. The swing cylinders (24) oscillate the boom (12) in an arc as indicated by the directional arrow shown in FIG. 5. By connecting the source of high pressure hydraulic fluid to ports (25) and (26), while allowing hydraulic fluid to flow out of ports (27) and (28), the boom (12) will move to the left (FIG. 1–4). Reversing the flow will cause the boom (12) to move to the right (FIGS. 1–4).

The engine (21) has a rotary output shaft (not shown) which connects to a clutch (29) which can be used to selectively transmit rotary power into a gear box (31). The gear box (31) is of a conventional type, including meshing bevel gears with input and output shafts angularly disposed with respect to each other. The ratio of power transmission can be set at any desired level, for example 1:1, or any other ratio desired.

Referring now to FIGS. 8–11, the power transmitting shaft (32) has a universal joint (33) at the top end and a universal joint (34) at the bottom end. The top end of the power transmitting shaft (32) has a coupler (35) which is also shown in detail in FIG. 10. The lower end of the power transmitting shaft (32) has a coupler (36) associated with the universal joint (34). This structure accommodates the movement of the engine output shaft (not shown) that results from the engine (21) being mounted on resilient mounts (22).

Figure 8:
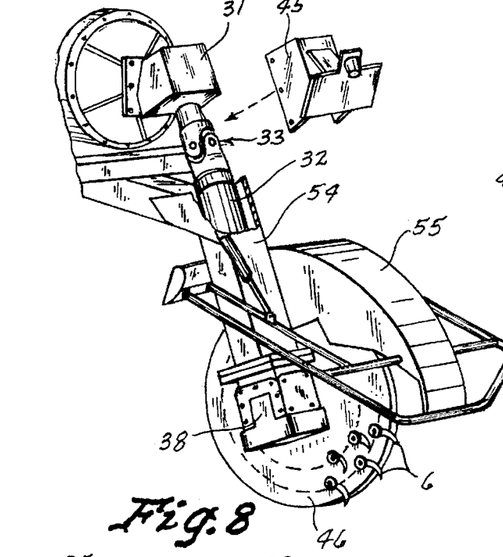
FIG. 8, is a perspective view of the cutter and drive assembly of the FIG. 1–7 embodiment with a shield exploded away to show a universal joint and a drive transmitting shaft.
Figure 9:
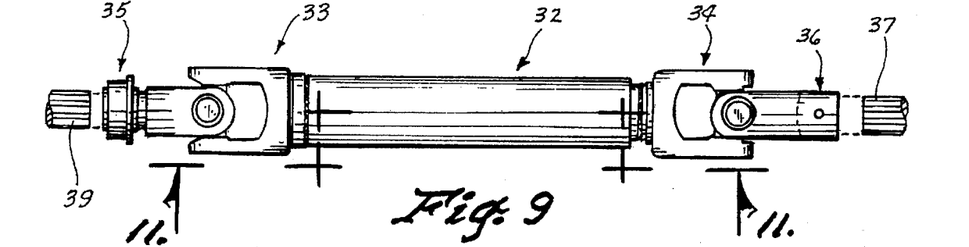
FIG. 9 is an exploded side elevational view of the drive shaft assembly and splined connectors as seen when removed from their housing.

Although the power transmitting shaft (32) can be reversed, in the preferred embodiment, the lower connector (36) has internal splines and telescopes over a splined shaft (37) which extends upwardly from the lower gear box (38). In this arrangement, the connector (36) is free to move along the axis of shaft (37). The connector (35) slides onto the splined shaft (39) of upper gear box (31) and connects to the upper gear box splined shaft (39) in the manner shown in FIG. 10. Steel balls (40) are biased by spring (41) and collar (42) into grooves (43) to prevent axial movement between the connector (35) and the shaft (39) when in the position shown in FIG. 10. When it is desired to remove the coupler (35) from the shaft (39), a collar (44) is pushed to the right, when viewed in FIG. 10, to cause the ring (42) to go to the right against the spring (41) and allow the balls (40) to move upwardly and out of grooves (43). This is a standard coupler as explained in more detail in U.S. Pat. No. 3,747,966 to Wilkes et at., which is incorporated herein by reference. As shown in FIG. 8, a shield (45) is removably attached to the top of housing (54) in order to allow easy access to the power transmitting shaft (32).

Figure 6:
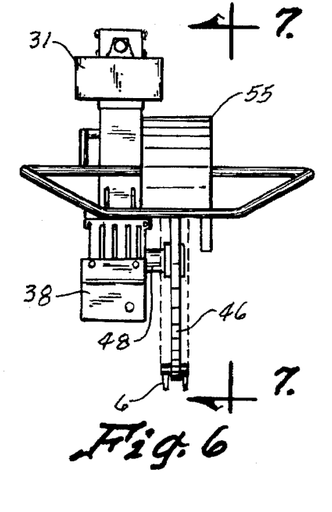
FIG. 6 is a front elevational view of the cutter assembly and drive assembly.
Figure 7:
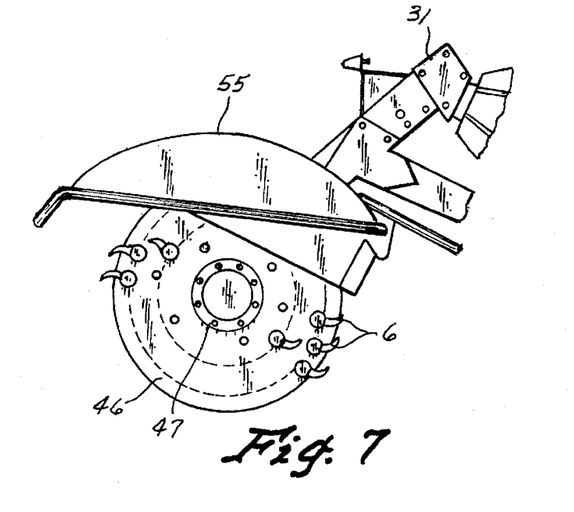
FIG. 7 is a side elevational view taken along line 7—7 of FIG. 6.

Referring now to FIGS. 6 and 7, a cutter wheel (46) is rigidly attached by nut and bolt structures (47) to a shaft (48), which shaft (48) is the output shaft from gear box (38). The cutter wheel (46) carries a number of teeth (6) spaced around and on both sides of the wheel (46), although only a few teeth (6) are shown in FIGS. 4, 6, 7, 16, 17 and 19 for illustration purposes. The cutter wheel (46) is mounted on one end of the cantilevered shaft (48) so that it can be easily attached or detached. This arrangement eliminates the need for removing cumbersome bearing structures which were used on both sides of the cutter wheel in prior art devices. As shown in FIGS. 4 and 8, the power to mm the cutter wheel (46) comes from the engine (21) which, through the clutch (29), transmits rotary power to the upper gear box (31). The upper gear box (31) then transmits rotary power downwardly through the coupler (35) and upper U-joint (33) to the power transmitting shaft (32). Power is then transmitted to the lower U-joint (34), to the lower coupling (36), and ultimately to shaft (37) of the lower gear box (38). This motion is then transmitted to shaft (48) to cause it to rotate and thereby cause the cutter wheel (46) to rotate as well.

Figures 11, 12, 13:
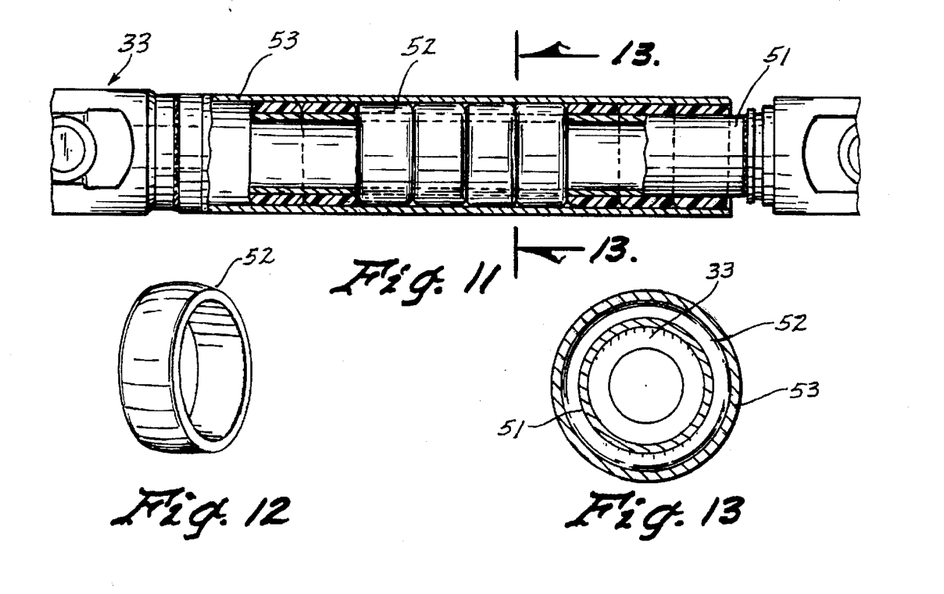
FIG. 11 is an enlarged cross sectional view taken along line 11—11 of FIG. 9 with portions of the drive assembly shown in cross section.
FIG. 12 is a perspective view of one of the ring shaped elastomeric members which are frictionally disposed between the inner and outer tubes of the drive shaft as shown in FIG. 11.
FIG. 13 is an enlarged cross sectional view taken along the line 13—13 of FIG. 11.

As most clearly shown in FIGS. 11–13, power transmitting shaft (32) includes an inner metal tube (51). Although shown as a tubular member, it is understood that it could be a solid arm if desired. This elongated member (51) has an external surface which carries a number of elastomeric ring-shaped members (52). An outer tubular member (53) extends over the elongated member (51), and the elastomeric members (52) are disposed to frictionally engage the interior surface thereof and the exterior surface of elongated member (51). The elongated member (51) is welded to one end of the U-joint (34), and one end of the tubular member (53) is welded to a portion of the opposite U-joint (33). The resilient members (52) absorb shocks. In practice, the elongated member (51) and tubular member (53) only rotate slightly with respect to each other to the extent of the elastic deformation of the resilient rings (52). Consequently, the power transmitting shaft (32) acts as a torsional shock absorber which causes the drive train of the stump cutter (10) to last longer than would ordinarily be possible by reducing damage caused by torsional shock.

Figure 2:
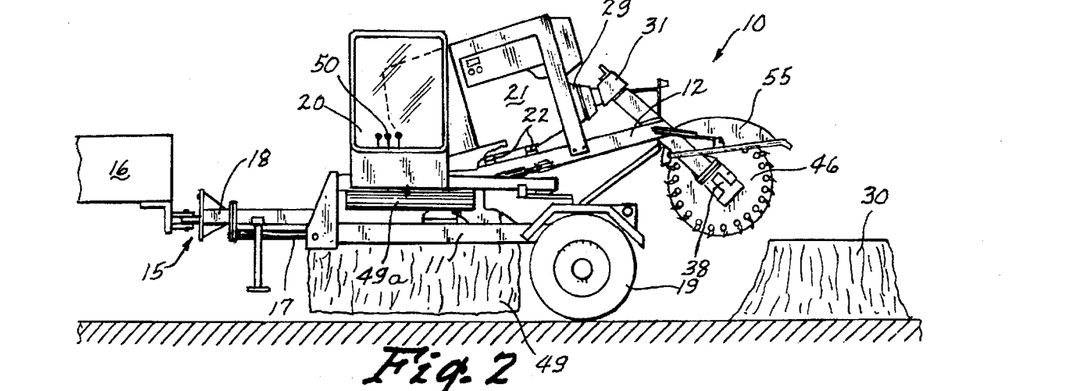
FIG. 2 is a side elevational view of the stump cutter of FIG. 1 shown in readiness to cut, a stump.
Figure 3:
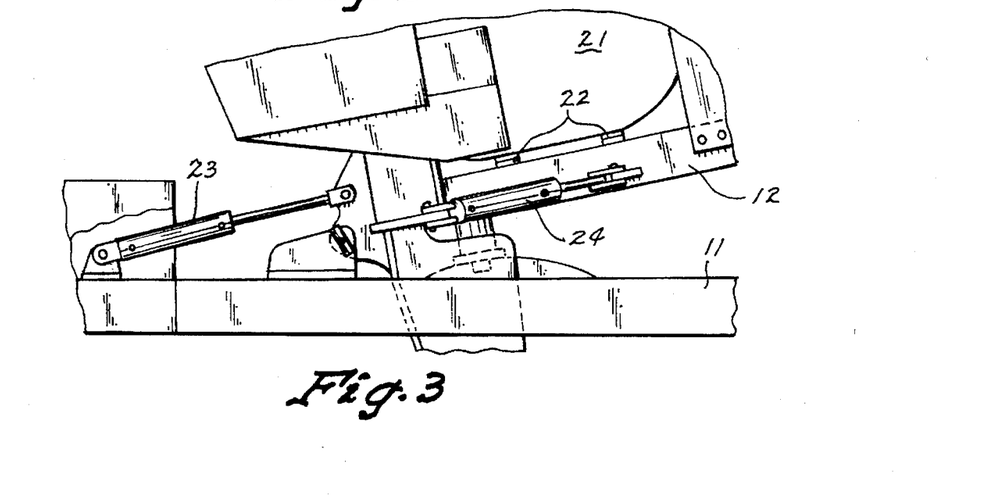
FIG. 3 is an enlarged partial side elevational view showing the cylinder that raises and lowers the stump cutter boom, and one of the cylinders that oscillates the boom from side-to-side.

To operate the preferred embodiment shown in FIGS. 1-13, the towing vehicle (16) is used to tow the stump cutter (10) to the location of the stamp (30), and position it as shown in FIG. 2, by backing it up to the stump (30). The operator then moves the panel (20) out to the operating position. The top of the panel (20) includes a transparent viewing window and a flexible rubber curtain (49a) hangs down from the panel (20) to protect the legs of the operator. The curtain assembly (49) actually extends completely around the rear and sides of the frame (11) of the stump cutter (10) to catch and collect the chips from the cutting wheel (46).

Once the engine (21) is started, the operator engages the clutch (29) to cause the drive train to rotate the cutter wheel (the pay operating the control levers (50) on the panel (20), the operator extends the cylinder (23) so that the cutter (46) engages the stump (30). The tongue (18) is also extended from the position shown in FIG. 2 to the position shown in FIG. 4. This can be done in any order desired. The lift cylinder (23), of course, causes the cutter wheel (46) to move up and down and the tongue cylinder (17) causes the cutter wheel to move fore and aft, towards and away from the stump (30). The operator simultaneously uses the controls (50) to cause the hydraulic swing cylinders (24) to move the boom (12) in an oscillating arc over the surface of the stump (30), thereby causing the stump to be cut away. The chips are collected in the area enclosed by the curtain assembly (49) as shown in FIG. 4. In the FIG. 4 position, when the cutter wheel shield (55) abuts the top of the stump (30), it pivots upwardly about a pivot point (56) and against the resistance cylinder (57), which biases it to its lowered position shown in FIGS. 1 and 2. Having the oscillating feature of the boom (12) is extremely important because if it were not present on the frame (11), it would require that the towing vehicle be used to re-position the cutter wheel from time to time to move it to one side or the other of the stump (30).

Figure 14:
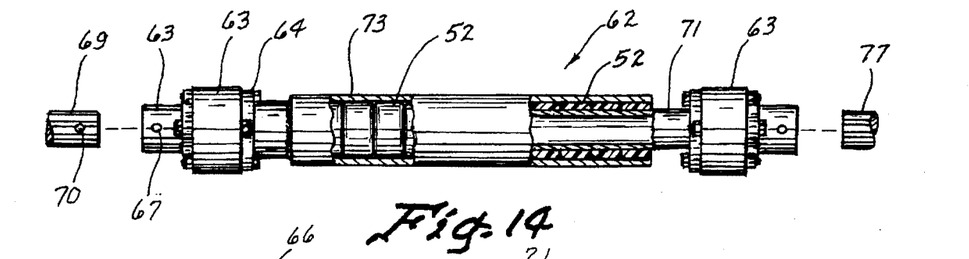
FIG. 14 is an exploded side elevational view of an alternate embodiment of a drive shaft showing how it attaches to splined shafts on each end thereof, and having a portion broken away to show the resilient ring members disposed between inner and outer tubes similar to the arrangement shown in FIG. 11.
Figure 15:
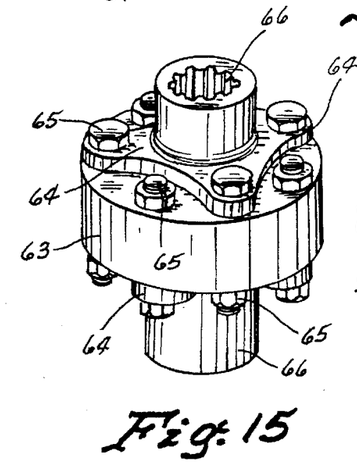
FIG. 15 is an enlarged perspective view of an elastomeric flexible coupler as shown on each end of the FIG. 14 drive shaft.

Referring now to FIGS. 14 and 15, an alternate power transmitting shaft (62) is shown. The shaft (62) has an elongated member (71) which corresponds to member (51) of the FIG. 11 embodiment, and an outer tubular member (73) which corresponds to tube (53) of FIG. 11. Similarly, rings (52) are also used to connect the elongated member (71) and outer tube (73) as in the FIG. 11 embodiment. An elastomeric flexible coupler member (63) is utilized on each end of the power transmitting shaft (62) and this elastomeric member is attached by identical flanges (64). The flanges (64) are mined out of phase as shown in FIG. 15, so that nut and bolt structures (65) that extend through the elastomeric member (63) do not connect to the flange (64) on the other side. This allows the flanges (64) to rotate somewhat with respect to each other and also to bend out of axial alignment to some extent. If flexible coupler members (63) are used, it is not necessary to use the shock absorbing shaft (62) including elastomeric rings (52) between tubes (71) and (73). One rigid shaft member (not shown) would replace tubes (71) and (73) and rings (52) in such an arrangement.

Figure 10:
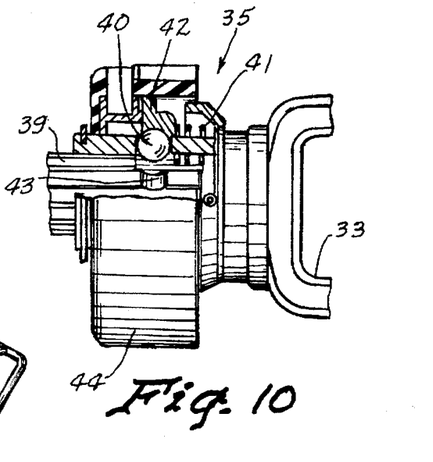
FIG. 10 is an enlarged view of the top connector element as shown on the left end of the FIG. 9 drive assembly with a portion thereof cut away to show the working components.

A splined coupler (66) telescopes over the upper gear box shaft (69). A hole (70) extends through shaft (69) and a pin extends through the opening (67) in coupler (66) and through opening (70) in splined shaft (69) to prevent relative axial movement. The coupler (35) of FIG. 10 could be used instead of the pin in opening (70). Of course since the shaft (69) is splined, and member (66) is internally splined, they will also transmit rotary power therebetween. The coupler (63) on the fight side of power transmitting shaft (62) is the same as that on the left as shown in FIG. 10, although a pin is not used on one end. In this case, the right end or lower end of the power transmitting shaft (62) is not pinned, because it is desired to allow some axial movement between the shaft (77) of the lower gear box and the flexible coupler (63) to which it attaches. For the purposes of this invention, the power transmitting shaft (32) of FIGS. 8-13 is interchangeable with the power transmitting shaft (62) of FIGS. 14 and 15.

Where there is very little mis-alignment in the drive train due to movement of the engine (21) on resilient engine mounts (22), crowned splines could be utilized instead of universal joints (33) and (34) of FIG. 11, or the resilient joint (63) of FIG. 14.

Figure 16:
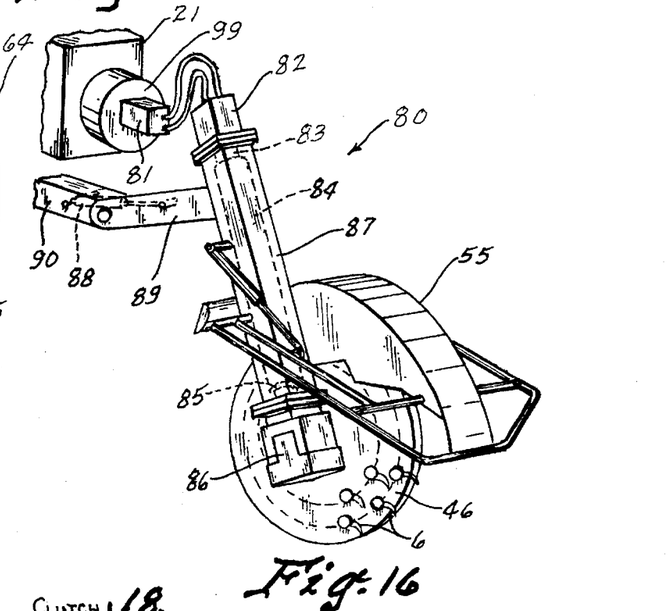
FIG. 16 is an alternate embodiment of the present invention showing a hydraulic drive pump and motor leading to a lower gear box for rotating a cutter wheel.

Referring now to FIG. 16, an alternate embodiment (80) of the present invention is shown. The engine (21), through a drive coupler (99), operates a variable displacement hydraulic pump (81) which transmits hydraulic fluid to and from a hydraulic motor (82). This hydraulic motor (82) rams an output shaft (83) which is splined and attached to an internally splined drive shaft (84). The drive shaft (84) is connected at the bottom thereof to splined shaft (85) extending upwardly from the gear box (86). Other connecting structures between output shaft (83) and shaft (85) can also alternatively be used. The output shaft of gear box (86) rotates the cutter wheel (46) as in the embodiment of FIGS. 1-13. The housing (87) is machined at the top and bottom with respect to the motor (82) and gear box (86) so that the splined shafts (83) and (85) are co-axially aligned and the connector shaft (84) is merely an internally splined connector which slides over the splined shaft (83) and (85). The housing (87) and cutter (46) can be moved up or down by a hydraulic cylinder (88) which pivots a boom portion (89) upwardly and downwardly with respect to the main boom (90).

Figure 17:
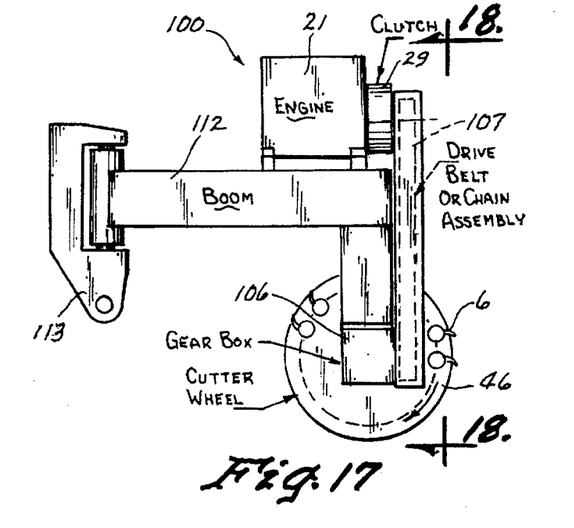
FIG. 17 is a side elevational view of a still further alternate embodiment of the present invention showing an engine mounted on a boom, and showing a drive belt or chain assembly for driving the lower gear box which, in ram, drives a cutter wheel.
Figure 18:
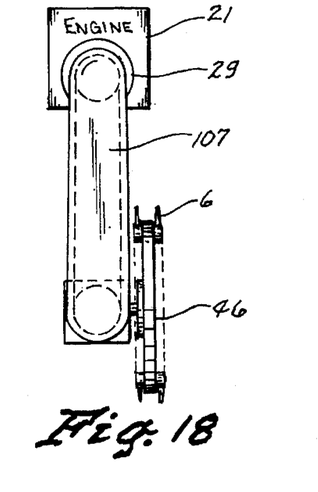
FIG. 18 is a front elevational view taken along line 18—18 in FIG. 17.

Referring now to FIGS. 17 and 18, another form of the invention (100) is shown with an engine (21) and clutch (29) rotating a lower gear box (106) through a drive belt or chain assembly (107). The boom (112) can pivot with respect to the frame through a bracket (113) which allows both vertical and horizontal pivoting. The cutter wheel (46) has teeth (6) positioned completely around the periphery and on both sides thereof, as indicated by the dashed lines of FIGS. 17-18.

Figure 19:
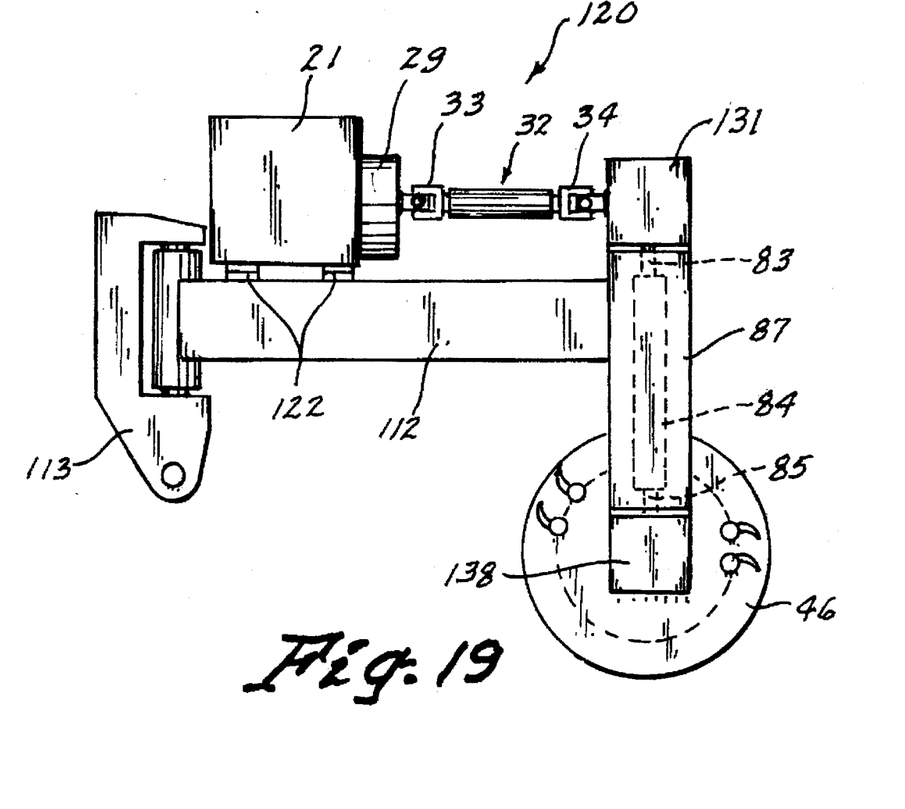
FIG. 19 is a side elevational view of still another alternate embodiment of the present invention showing the drive assembly connecting the clutch of the engine to an upper gear box of a two gear box mechanism which drives the cutter wheel using a second drive shaft interconnecting the two gear boxes.

A still further embodiment (120) of the invention is shown in FIG. 19, and also has an engine (21) and clutch (29) connected by a boom (112) and connecting structure (113) as in the FIG. 17 embodiment. The cutter wheel (46) of the FIG. 19 embodiment is operated through a drive train which includes a drive train shaft (32) having universal joints (33) and (34) thereon like that shown in FIGS. 9–13. The upper gear box (131) is connected to a lower gear box (138) through an arrangement (87) like that shown in FIG. 16. The splined output shaft (83) and splined input shaft (85) are connected by an internally splined connector shaft (84). As in the FIG. 16 embodiment, by machining the sleeve (87) to precisely connect to gear box housings (131) and (138), the axis of splined shafts (83) and (85) will be co-axial. Accordingly, the embodiment (120) of FIG. 19 allows for some mis-alignment, as that resulting from the use of resilient engine mounts (122). The mis-alignment is accommodated by the transmitting shaft (32) with its universal joints (33) and (34).

Accordingly it will be appreciated that the preferred embodiments shown herein do indeed accomplish the aforementioned objects. Obviously many modifications and variations of the present invention are possible in light of the above teachings. It is therefore to be understood that, within the scope of the appended claims, the invention may be practiced otherwise than as specifically described.

We claim:

1. In a stump cutter having a frame including a movable boom, a drive engine mounted on the frame, the drive engine including a rotating output shaft, and a cutter drivably attached to a rotatable cutter shaft disposed on said boom, the improvement comprising:
    shaft means for drivably connecting the output shaft and the cutter shaft, the shaft means having a first end and a second end;
    first coupling means for connecting the first end of the shaft means to the engine output shaft; and
    second coupling means for connecting the second end of the shaft means to the cutter shaft.

2. The stump cutter of claim 1 wherein the first coupling means includes a gear box.

3. The stump cutter of claim 1 wherein said first coupling means includes a clutch.

4. The stump cutter of claim 1 wherein the second coupling means includes a gear box.

5. The stump cutter of claim 1 further including means for flexibly aligning the shaft means between the first and second coupling means.

6. The stump cutter of claim 1 wherein the flexible alignment means includes a universal joint disposed to interconnect the first coupling means and the first end of the shaft means.

7. The stump cutter of claim 1 wherein the flexible alignment means includes a universal joint disposed to interconnect the second coupling means and the second end of the shaft means.

8. The stump cutter of claim 6 wherein the flexible alignment means includes a universal joint disposed to interconnect the second coupling means and the second end of the shaft means.

9. The stump cutter of claim 1 wherein the flexible alignment means includes an elastomeric joint disposed to interconnect the first coupling means and the first end of the shaft means.

10. The stump cutter of claim 1 wherein the flexible alignment means includes an elastomeric joint disposed to interconnect the second coupling means and the second end of the shaft means.

11. The stump cutter of claim 9 wherein the flexible alignment means includes an elastomeric joint disposed to interconnect the second coupling means and the second end of the shaft means.

12. The stump cutter of claim 1 wherein the shaft means includes means for releasably connecting the first and second ends of the shaft means.

13. The stump cutter of claim 12 wherein the releasable connecting means includes:
    a sleeve rigidly attached to the first end of the shaft means and disposed to extend toward the second end of the shaft means, said sleeve having an interior surface;
    an arm rigidly attached to the second end of the shaft means and disposed to extend within the sleeve toward the first end of the shaft means, said arm having an exterior surface; and
    an intermediate ring means disposed between the sleeve and the arm to simultaneously engage the interior surface of the sleeve and the exterior surface of the arm.

14. The stump cutter of claim 13 wherein the ring means includes a ring formed of an elastomeric material.

15. The stump cutter of claim 14 wherein the elastomeric material is rubber.

16. The stump cutter of claim 14 wherein said ring means includes a plurality of rings.

17. The stump cutter of claim 1 wherein said first coupling means includes means for selectively preventing relative axial movement between said engine output shaft and said cutter shaft.

18. The stump cutter of claim 17 wherein said means for preventing relative axial movement is operably disposed between the engine output shaft and the first coupling means.

19. The stump cutter of claim 1 wherein said engine is mounted to the frame on resilient mounts.

20. The stump cutter of claim 19 including means for permitting relative axial movement between the output shaft and the cutter shaft.

21. The stump cutter of claim 20 wherein said means for permitting relative axial movement is operably disposed between the shaft means and the cutter shaft.

22. The stump cutter of claim 1 wherein said cutter shaft is cantilevered and has a free end, said cutter being attached to said free end of the cutter shaft whereby said cutter can be easily removed or attached thereto.

23. The stump cutter of claim 1 wherein said frame has a longitudinal axis, said stump cutter including means for selectively moving said boom laterally with respect to said longitudinal axis.

24. The stump cutter of claim 23 wherein said lateral boom moving means includes means for pivoting said boom about a substantially vertical axis.

25. The stump cutter of claim 24 including means for moving said boom up and down.

26. The stump cutter of claim 24 including means for moving said boom fore and aft along said longitudinal axis.

27. The stump cutter of claim 1 wherein said engine is mounted on the boom.

28. A stump cutter comprising:
    a frame including a movable boom;
    an engine mounted on the frame, said engine having a power output shaft means for providing rotary power, said power output shaft means being rotatable about a first axis;
    a cutter;
    a driven shaft disposed on the boom and attached to said cutter for transmitting rotary power to said cutter when said driven shaft is rotated, said driven shaft being rotatable about a second axis; and
    a connecting shaft operably attached about a third axis at one end thereof to said power output shaft means and at the other end thereof being operatively attached to said driven shaft, whereby rotary power will be transmitted from said power output shaft, through said connecting shaft to said driven shaft and ultimately to said cutter.

29. The stump cutter of claim 28 wherein said second and third axes are transversely disposed with respect to each other.

30. The stump cutter of claim 29 wherein said first and third axes are transversely disposed with respect to each other.

31. The stump cutter of claim 28 wherein said connecting shaft includes means for absorbing torsional shock between the cutter wheel and the power output shaft means.

32. The stump cutter of claim 31 wherein said shock absorbing means comprises:
- an elongated member having an external surface thereon;
- a tubular member disposed around said external surface, said tubular member having an internal surface; and
- an elastomeric member having an internal surface disposed around and in abutment with said elongated member and an outer surface in abutment with the internal surface of said tubular member whereby the elastomeric member will absorb shock between relative changing rotational movement of the elongated member and tubular member, whereby shock forces passing between said driven shaft and said power output shaft will be minimized.

33. The stump cutter of claim 28 wherein said frame has a longitudinal axis, said stump cutter including means for selectively moving said boom laterally with respect to said longitudinal axis.

34. The stump cutter of claim 33 wherein said lateral boom moving means includes means for pivoting said boom about a substantially vertical axis.

35. The stump cutter of claim 34 including means for moving said boom up and down.

36. The stump cutter of claim 34 including means for moving said boom fore and aft along said longitudinal axis.

37. The stump cutter of claim 28 wherein said engine is mounted on the boom.

38. A stump cutter comprising:
- a frame including a movable boom;
- an engine mounted on the frame;
- a power shaft operably attached to said engine;
- a first gear box operably attached to said power shaft;
- a second gear box having a rotary shaft extending therefrom;
- a stump cutter secured to said rotary shaft; and
- a drive assembly connecting said first gear box to said second gear box.

39. The stump cutter of claim 38 wherein said drive assembly includes:
- first and second universal joints connected to said first and second gear boxes respectively; and
- a drive shaft connecting said first and second universal joints.

40. The stump cutter of claim 39 comprising means in said drive assembly for accommodating relative rotary movement between said first and second universal joints.

41. The stump cutter of claim 39 comprising:
- wheels for supporting said frame, said engine mounted with a longitudinal axis of said engine lying in a vertical plane, which vertical plane is substantially transversely disposed with respect to an axis of rotation of said wheels.

42. The stump cutter of claim 38 including a disconnect clutch for disconnecting said engine from said first gear box.

43. The stump cutter of claim 38 wherein said engine is mounted to the frame on resilient mounts.

44. The stump cutter of claim 43 wherein said drive assembly includes means for accommodating relative axial movement of said first and second gear boxes toward and away from one another.

45. The stump cutter of claim 38 wherein said frame has a longitudinal axis, said stump cutter including means for selectively moving said boom laterally with respect to said longitudinal axis.

46. The stump cutter of claim 45 wherein said lateral boom moving means includes means for pivoting said boom about a substantially vertical axis.

47. The stump cutter of claim 46 including means for moving said boom up and down.

48. The stump cutter of claim 46 including means for moving said boom fore and aft along said longitudinal axis.

49. The stump cutter of claim 38 wherein said engine is mounted on the boom.

50. A stump cutter comprising:
- a frame including a movable boom;
- an engine mounted on the frame, said engine having a power output shaft means for providing rotary power;
- a cutter;
- a driven shaft attached to said cutter for transmitting rotary power to said cutter when said driven shaft is rotated; and
- a rotatable connecting shaft operably attached at one end thereof to said power output shaft means and at the other end thereof being operatively attached to said driven shaft whereby rotary power will be transmitted from said power output shaft, through said connecting shaft, to said driven shaft and thereby ultimately to said cutter.

51. The stump cutter of claim 50 wherein said connecting shaft includes means for absorbing torsional shock between the cutter wheel and the power output shaft means.

52. The stump cutter of claim 51 wherein said shock absorbing means comprises:
- an elongated member having an external surface thereon;
- a tubular member disposed around said external surface, said tubular member having an internal surface; and
- an elastomeric member having an internal surface disposed around and in abutment with said elongated member and an outer surface in abutment with the internal surface of said tubular member whereby the elastomeric member will absorb shock between relative changing rotational movement of the elongated member and tubular member, whereby shock forces passing between said driven shaft and said power output shaft will be minimized.

53. The stump cutter of claim 50 wherein said frame has a longitudinal axis, said stump cutter including means for selectively moving said boom laterally with respect to said longitudinal axis.

54. The stump cutter of claim 53 wherein said lateral boom moving means includes means for pivoting said boom about a substantially vertical axis.

55. The stump cutter of claim 54 including means for moving said boom up and down.

56. The stump cutter of claim 54 including means for moving said boom fore and aft along said longitudinal axis.

57. The stump cutter of claim 50 wherein said engine is mounted on the boom.

58. A stump cutter comprising:

a frame including a movable boom;

an engine mounted on the frame;

a power shaft operably attached to said engine;

means for transmitting rotary power operably attached to said power shaft;

a gear box having a rotary shaft extending therefrom;

a cutter secured to said rotary shaft; and a drive assembly connecting said rotary power transmitting means to said gear box.

59. The stump cutter of claim 58 including a disconnect clutch for operably disconnecting said engine from said first gear box.

60. The stump cutter of claim 59 wherein said frame has a longitudinal axis, said stump cutter including means for selectively moving said boom laterally with respect to said longitudinal axis.

61. The stump cutter of claim 60 wherein said lateral boom moving means includes means for pivoting said boom about a substantially vertical axis.

62. The stump cutter of claim 61 including means for moving said boom up and down.

63. The stump cutter of claim 61 including means for moving said boom fore and aft along said longitudinal axis.

64. The stump cutter of claim 59 wherein said engine is mounted on the boom.

* * * * *